United States Patent
Ito et al.

(10) Patent No.: US 6,580,077 B2
(45) Date of Patent: *Jun. 17, 2003

(54) INFRARED SENSOR

(75) Inventors: Satoru Ito, Hakui (JP); Isamu Wakamiya, Ishikawa-ken (JP)

(73) Assignee: Murata Manufacturing Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,654

(22) Filed: May 21, 1999

(65) Prior Publication Data

US 2002/0175285 A1 Nov. 28, 2002

(30) Foreign Application Priority Data

May 25, 1998 (JP) .................... 10-161386

(51) Int. Cl.[7] .................................. G01J 5/06
(52) U.S. Cl. .................... 250/338.3; 250/353
(58) Field of Search .................... 250/338.3, 353, 250/349, DIG. 1

(56) References Cited

U.S. PATENT DOCUMENTS

| 3,757,127 A | | 9/1973 | Dhaka | |
| 4,943,800 A | | 7/1990 | Ikeda et al. | |
| 5,323,025 A | * | 6/1994 | Ito et al. | 250/338.3 |
| 5,344,518 A | * | 9/1994 | Ito et al. | 250/338.3 |
| 5,420,426 A | * | 5/1995 | Inoue | 250/338.3 |
| 5,468,960 A | | 11/1995 | Sugimoto et al. | |
| 5,567,941 A | * | 10/1996 | Fujikawa et al. | 250/353 |
| 5,567,942 A | * | 10/1996 | Lee et al. | 250/353 |
| 5,962,854 A | * | 10/1999 | Endo | 250/349 |
| 6,049,080 A | * | 4/2000 | Ito | 250/338.3 |
| 6,121,614 A | * | 9/2000 | Taniguchi et al. | 250/338.3 |
| 6,137,107 A | * | 10/2000 | Hanson et al. | 250/338.3 |
| 6,121,615 A1 | * | 4/2001 | Ito et al. | 250/338.3 |

FOREIGN PATENT DOCUMENTS

| DE | 3035933 | 4/1981 |
| DE | 3202819 | 8/1983 |
| DE | 19739477 | 5/1998 |
| EP | 0283264 | 9/1988 |
| EP | 0829705 | 3/1998 |
| JP | 2-129951 | 5/1990 |
| JP | 5-19926 | 3/1993 |
| JP | 8-153844 | 6/1996 |
| JP | 9-205264 | 8/1997 |

* cited by examiner

Primary Examiner—Constantine Hannaher
Assistant Examiner—Otilia Gabor
(74) Attorney, Agent, or Firm—Keating & Bennett, LLP (57) ABSTRACT

An infrared sensor comprises: a stem; a pyroelectric element arranged on one side of the stem; a conversion circuit for changing electric charge generated in the pyroelectric element into a signal; and a plurality of lead terminals formed so as to be extended to the other side of the stem and electrically connected to the conversion circuit, the lead terminals being fixed to the stem by caulking.

10 Claims, 7 Drawing Sheets

INFRARED SENSOR

BACKGROUND OF THE INVENTION

1. Field of the Invention

The present invention relates to an infrared sensor, and more particularly to an infrared sensor to be incorporated into a burglar alarm or the like and used for detecting human beings and other living organisms.

2. Description of the Related Art

Figure 14:
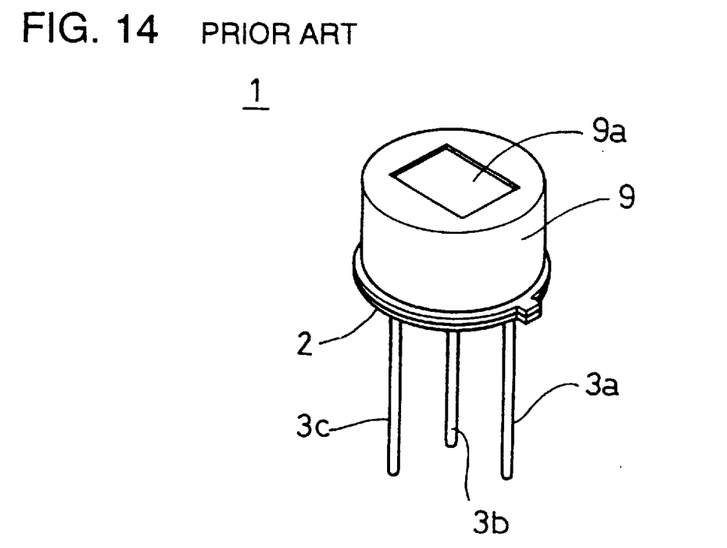
FIG. 14 is a perspective view of one example of conventional infrared sensors.
Figure 15:
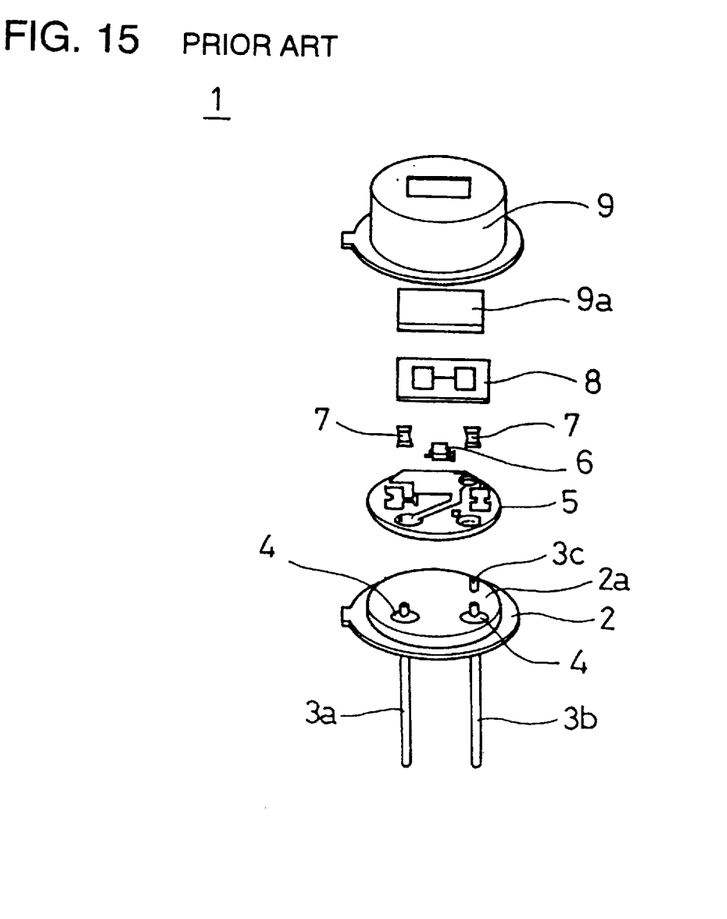
FIG. 15 is an exploded perspective view of a conventional infrared sensor shown in FIG. 14.

FIG. 14 is a perspective view showing one example of conventional infrared sensors, and FIG. 15 is an exploded perspective view thereof. The infrared sensor 1 comprises a metal stem 2 having a step portion 2a, called an islet. Through-holes are formed in the metal stem 2 and three lead terminals 3a, 3b, 3c are passed through the through-holes. The lead terminals 3a, 3b are sealed with insulating glass 4 having nearly the same thermal coefficient of expansion as the metal stem 2, and the lead terminals 3a, 3b are fixed and at the same time electrically insulated from the metal stem 2. The ground lead terminal 3c is fixed by soldering, pressing in, etc. so as to be electrically connected to the metal stem 2. Usually, the metal stem is formed of a hermetic sealing type metal stem used for operational amplifiers.

A circuit board 5 is arranged on the step portion 2a of the metal stem 2. The circuit board 5 is formed of an insulating material. A conversion circuit for converting electric charge generated in a pyroelectric element (to be described later) into a signal is formed on the circuit board 5 using, for example, a field-effect transistor (FET) 6. This conversion circuit is connected to the lead terminals 3a, 3b, 3c which protrude from the step portion 2a of the metal stem 2. Further, a pyroelectric element 8, connected to the conversion circuit formed on the circuit board 5, is arranged on the circuit board 5 through supports 7. A metal cap 9 covers the pyroelectric element. A window is formed in the cap 9, and an optical filter 9a is attached to the window. Infrared rays are conveyed to the pyroelectric element 8 through the optical filter 9a. The cap 9 is fixedly mounted on the stem 2 by electric welding. The metal stem 2 and cap 9 electromagnetically shield the conversion circuit and suppress the effect of external noise on the conversion circuit.

In this infrared sensor 1, electric charge is produced in the pyroelectric element 8 by infrared rays which enter through the window portion of the cap 9 and the electric charge is converted into a signal by the conversion circuit. By measuring of the output signal from the infrared sensor 1, the movement of human beings and other living organisms can be detected. In order to thermally and electro-magnetically make good use of the pyroelectric effect of the pyroelectric element 8, hermetic sealing is provided by the metal stem 2 and cap 9 and the effect of disturbance noise is restrained by electromagnetic shielding.

There has been recently arisen a large demand for burglar alarms and the like using this type of infrared sensor for home use. Such burglar alarms must be inexpensive for home use. However, the conventional infrared sensor is expensive, as the stems used in such infrared sensors are expensive because they are produced by a precise manufacturing method. Further, the lead terminals which protrude inside the stem create inductance components because of the effect of external high-frequency noise and the noise induces a voltage in the high-impedance system to cause failure of the infrared sensor.

SUMMARY OF THE INVENTION

It is therefore an object of the present invention to provide an infrared sensor which can easily be produced, which is a stable high-impedance system substantially unaffected by noise, and which exhibits a small incidence of failure.

The infrared sensor comprises a stem, a pyroelectric element arranged on one side of the stem, a conversion circuit for changing electric charge generated in the pyroelectric element into a signal, and a plurality of lead terminals formed so as to be extended to the other side of the stem and electrically connected to the conversion circuit. The lead terminals are fixed to the stem by caulking.

In this infrared sensor, the stem is formed with insulating material, and a conversion circuit is formed on the surface of one side of the stem. Further, the stem of one layer or multilayer construction is formed, and at least on one side surface of the stem the grounding electrode for electromagnetic shielding is formed.

Moreover, a case made up of conductive material which is to cover one side of the stem, is preferably included, and the case and stem are securely fastened and sealed with conductive resin adhesive.

By caulking the lead terminals (i.e., deforming them the through holes through which they extend), the lead terminals are fixed to the stem and the through-holes for the lead terminals formed in the stem are sealed. Further, by caulking the lead terminals, the lead terminals do not extend on one side of the stem and accordingly it is unlikely that voltages will be induced in the lead terminals inside the stem by disturbance noise.

When the stem is formed by an insulating material and a conversion circuit is formed on one surface of the stem, it becomes unnecessary to utilize another circuit board and the size of the infrared sensor can be reduced.

Furthermore, by forming the grounding electrode on the stem, it is possible to achieve electro-magnetic shielding thereby reducing the effect of disturbance noise. Moreover, the grounding electrode is able to be formed on one side or both sides of the stem, and when the stem is made up of multiple layers, the grounding electrode can be formed in one layer or a plurality of layers of the stem.

By providing a case over one main surface of the stem, sealing the case and stem by conductive resin adhesive, and sealing the stem by caulking the lead terminals, the pyroelectric element and conversion circuit are hermetically sealed. By forming the cap from conductive material and by forming a grounding electrode on the stem, an excellent electro-magnetic shielding effect is provided.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 1:
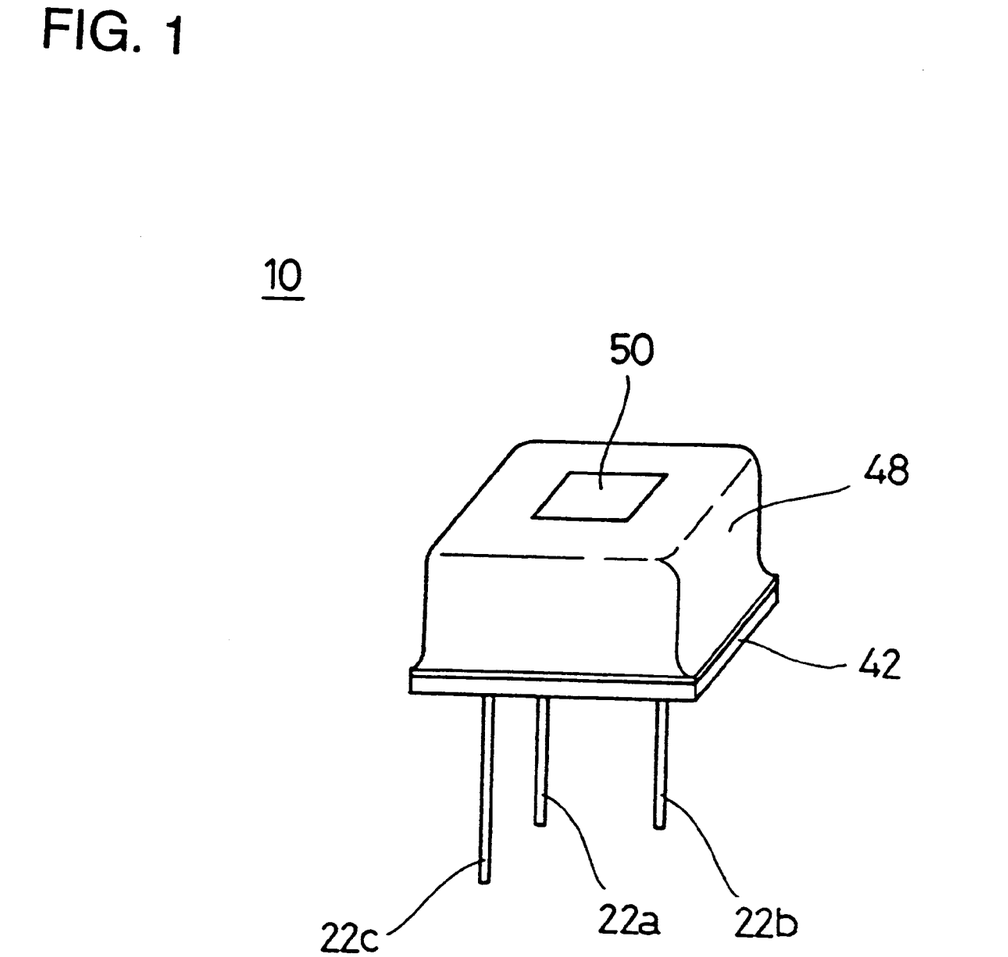
FIG. 1 is a perspective view showing one example of an infrared sensor of the present invention.
Figure 2:
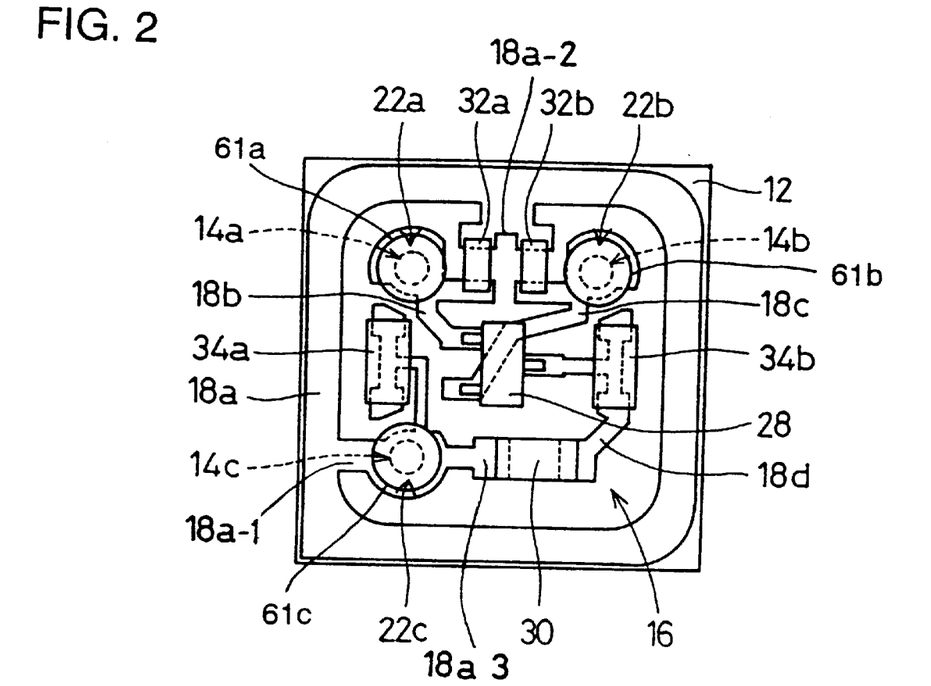
FIG. 2 is a top view showing the inside of an infrared sensor in FIG. 1.
Figure 3:
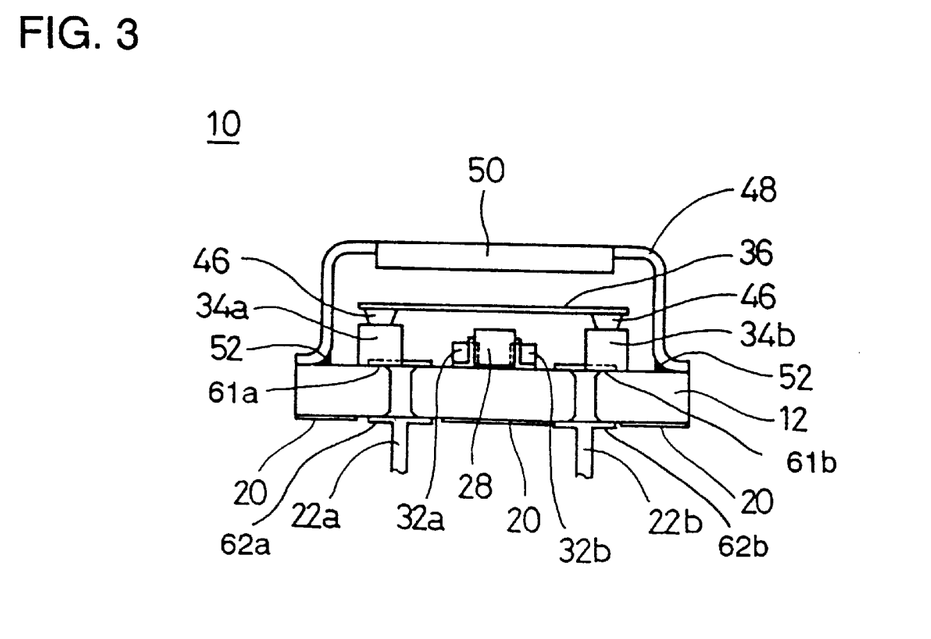
FIG. 3 is a cross section showing an infrared sensor in FIG. 1.

As best shown in FIGS. 1–3, infrared sensor 10 includes a circuit board 12 having, for example, a square shape. As will be explained later, the circuit board 12 functions as a stem of the infrared sensor 10. The circuit board 12 is formed using, for example, insulating material such as insulating ceramics, glass epoxy resin, etc. Three through-holes 14a, 14b, 14c are formed in the circuit board 12 as shown in FIGS. 2 and 3. A conversion circuit 16 which converts electric charge generated in a pyroelectric element 36 into a signal is formed on one major surface of the circuit board 12.

A plurality of electrodes 18a, 18b, 18c, 18d are formed on the one major surface of the circuit board 12. Electrode 18a is formed on the upper surface of the circuit board 12 so as to extend in a closed loop along the outer circumference of the circuit board 12. A first portion 18a-1 of electrode 18a extends to the through-hole 14c as shown in the lower left quadrant of FIG. 2.

A second portion 18a-2 protrudes towards the central portion of the circuit board 12 at a location between the through-holes 14a, 14b. The electrodes 18b, 18c, 18d are formed to come close to one another in the central portion of the circuit board 12. The electrode 18b extends to the through-hole 14a and to a location facing the protruded portion 18a-2 of the electrode 18a. The electrode 18c extends to the through-hole 14b and to a location facing the protruded portion 18a-2 of the electrode 18a. Furthermore, the electrode 18d extends to a location facing a portion 18a-3 of the electrode 18a which extends from the through-hole 14c. Moreover, a ground electrode 20 is formed on the entire surface bottom of the circuit board 12, except the portion surrounding the through-holes 14a, 14b. An electrode is formed on the inside surface of the electrode through-hole 14c to connect the electrode 18a on the top side of one side of the circuit board 12 and the grounding electrode 20 on the bottom side thereof.

The lead terminals 22a, 22b, 22c are passed through the through-holes 14a, 14b, 14c, respectively. The lead terminals 22a, 22b, 22c are fixed, preferably by caulking (i.e., sealing), on both sides of the circuit board 12. More specifically, the lead terminals 22a, 22b, 22c have a pair of protrusion portions 61a and 62a, 61b and 62b, and 61c and 62c, respectively, which serve to caulk (seal) the lead terminals 22a, 22b, 22c to the circuit board 12 by pinching the circuit board 12 with the pair of the portion portions 61a and 62a, 61b and 62b, and 61c and 62c, respectively.

Figure 4:
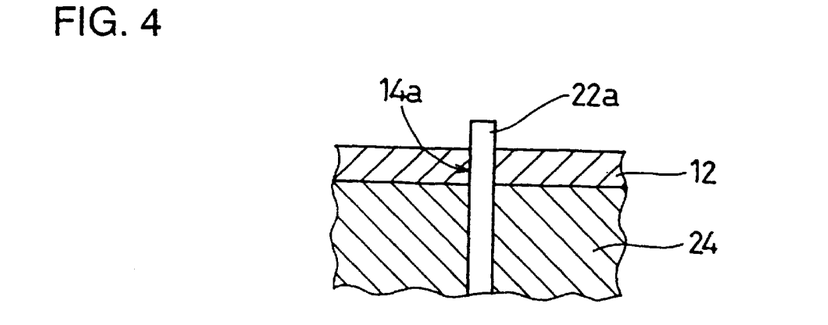
FIG. 4 is a cross sectional view showing that a lead terminal held by a chuck is passed through a through-hole in a stem.
Figure 5:
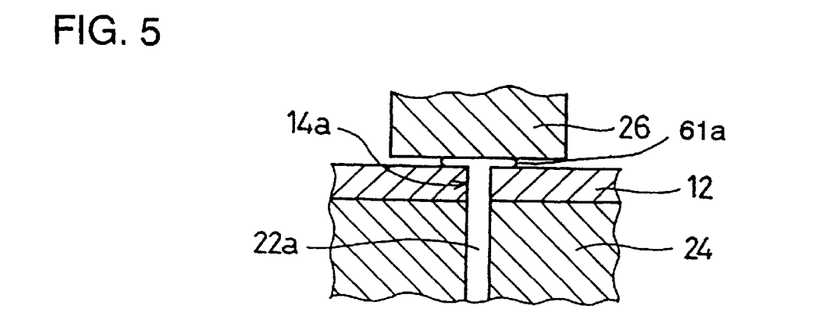
FIG. 5 is a cross sectional view showing the tip portion of a lead terminal which is crushed on the side of one surface of a stem shown in FIG. 4.
Figure 6:
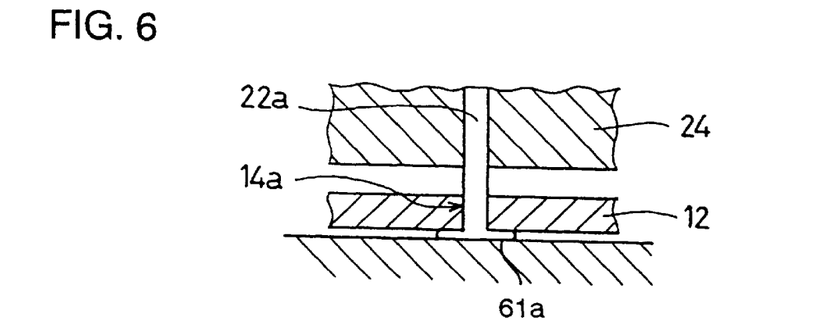
FIG. 6 is a cross sectional view showing a lead terminal which is held at a location away from the other surface of a stem by a chuck.
Figure 7:
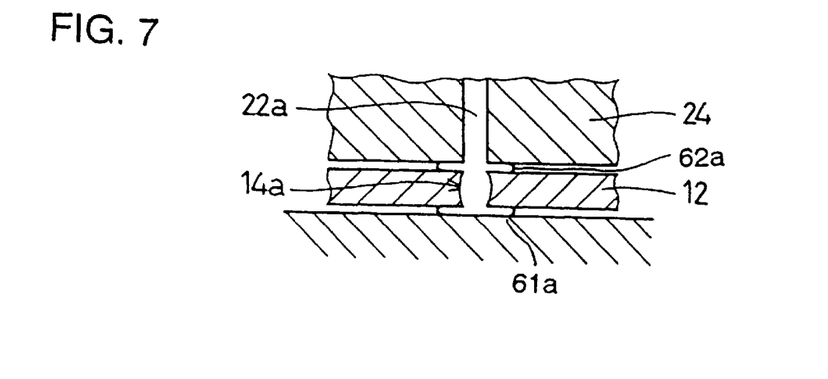
FIG. 7 is a cross sectional view showing the lead terminal crushed on the side of the other surface of a stem.

Referring to FIGS. 4 to 7, the preferred process for fixing the lead terminal 22a to the circuit board 12 is explained. As shown in FIG. 4, the lead terminal 22a which initially has a simple stick shape, is passed through the through-hole 14a. The lead terminal 22a is held on the bottom side of the circuit board 12 by a chuck. Next, as shown in FIG. 5, the tip portion of the lead terminal 22a located on the top surface of the circuit board 12 is crushed, for example, by a punch to form a protrusion portion 61a at one end of the lead terminal 22a. The protrusion portion 61a is usually formed in a flat circular shape, but may have other shapes. Further, as shown in FIG. 6, the lead terminal 22a is held on the bottom side of the circuit board 12 at a location removed from the surface of the other side of the circuit board 12 by the chuck 24. As shown in FIG. 6, when the protrusion portion 61a of the lead terminal 22a crushed by the metal punch 24 is pressed down, the lead terminal 22a is crushed on the side of the other side of the circuit board 12 by pushing the chuck 24 toward the side of the circuit board 12 to form a protrusion portion 62a as shown in FIG. 7. In this way, the lead terminal 22a is crushed on both sides of the circuit board 12. As a result, the through-hole 14a is hermetically sealed by the protrusion portion 61a and 62a, and the lead terminal 22a is fixed to the circuit board 12 by the protrusion portion 61a and 62a. As exaggeratively indicated in FIG. 7, the lead terminal 22a expands in the through-hole 14a by caulking so that the lead terminal 22a seals a spaced which might exist between the outer surface of the lead terminal 22a and the inner surface of the through-hole 14a, thus further ensure the sealing of the through-hole 14a.

The other lead terminals 22b, 22c are also fixed in the through-holes 14b, 14c in a similar way. Because the through-holes 14a, 14b are located in the portions in which the electrodes 18b, 18c are respectively formed, the lead terminals 22a, 22b are electrically connected to the electrodes 18b, 18c at the protrusion portions 61a and 61b, respectively. Further, as the through-hole 14c is located in the portion in which the electrode 18a is formed, the lead terminal 22c is electrically connected to the electrode 18a at the protrusion portion 61c. At this time, as the electrode 18a and the grounding electrode 20 are connected, the lead terminal 22c is also connected to the grounding terminal 20.

In the central portion on one surface side of the circuit board 12, a field-effect transistor (FET) 28 is mounted. The drain and source of the FET 28 are connected to the electrodes 18b, 18c respectively, and the gate is connected to the electrode 18d. Further, in the vicinity of the through-hole 14c, a leakage resistor 30 is connected between the electrode 18a and electrode 18d. Between the through-holes 14a, 14b, bypass capacitors 32a, 32b are connected between the electrodes 18a, 18b and between the electrodes 18a, 18c, respectively. A connecting part 34a made up of conductive material is formed on the electrode 18a extended from the through-hole 14c and in the middle portion of the electrode 18d a connecting portion 34b made up of conductive material is formed. Between these connecting portions 34a, 34b, a pyroelectric element 36 is mounted.

Figure 8:
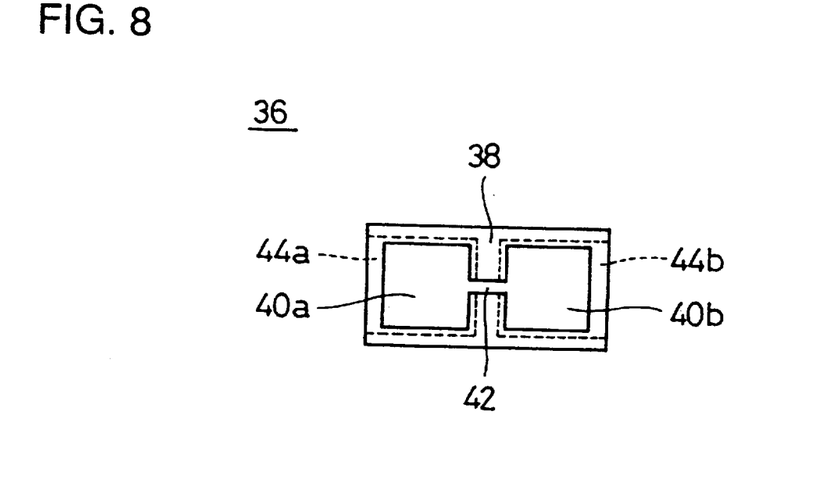
FIG. 8 is an top view showing one example of a pyroelectric element to be used in an infrared sensor shown in FIGS. 1 through 3.

Pyroelectric element 36 preferably contains a plate-like pyroelectric body 38 as shown in FIG. 8. The pyroelectric body 38 is made up of, for example, lead zirconate titanate. On one side surface of the pyroelectric material 38 electrodes 40a, 40b having a spacing therebetween are formed. These electrodes are connected by a narrow electrode 42. Further, on the other side surface of the pyroelectric material 38, electrodes 44a, 44b (shown in phantom) are formed at the locations which face the electrodes 40a, 40b. And the electrodes 44a, 44b on the other side surface of the pyroelectric material 38 are attached to the connecting portions 34a, 34b by conductive resin adhesive 46 or the like. Accordingly, the pyroelectric element 36 is fixed to the connecting parts 34a, 34b and the electrodes 44a, 44b are electrically connected to the connecting parts 34a, 34b.

Further, as best shown in FIG. 3, a cap 48 is placed over one main surface of the circuit board 12 to cover the conversion circuit 16 and the pyroelectric element 36. The cap 48 is made up of conductive material such as metal. A through-hole is formed in the central portion of the cap 48 and an optical filter 50 is mounted therein. This optical filter 50 passes and conveys external infrared rays to the pyroelectric element 36. Cap 48 is preferably attached to the electrode 18a of the circuit board 12 by conductive resin adhesive 52. By this conductive resin adhesive 52 the cap 48 is fixed to the circuit board 12, and at the same time the cap 48 is electrically connected to the electrode 18a and the grounding electrode 20.

Figure 9:
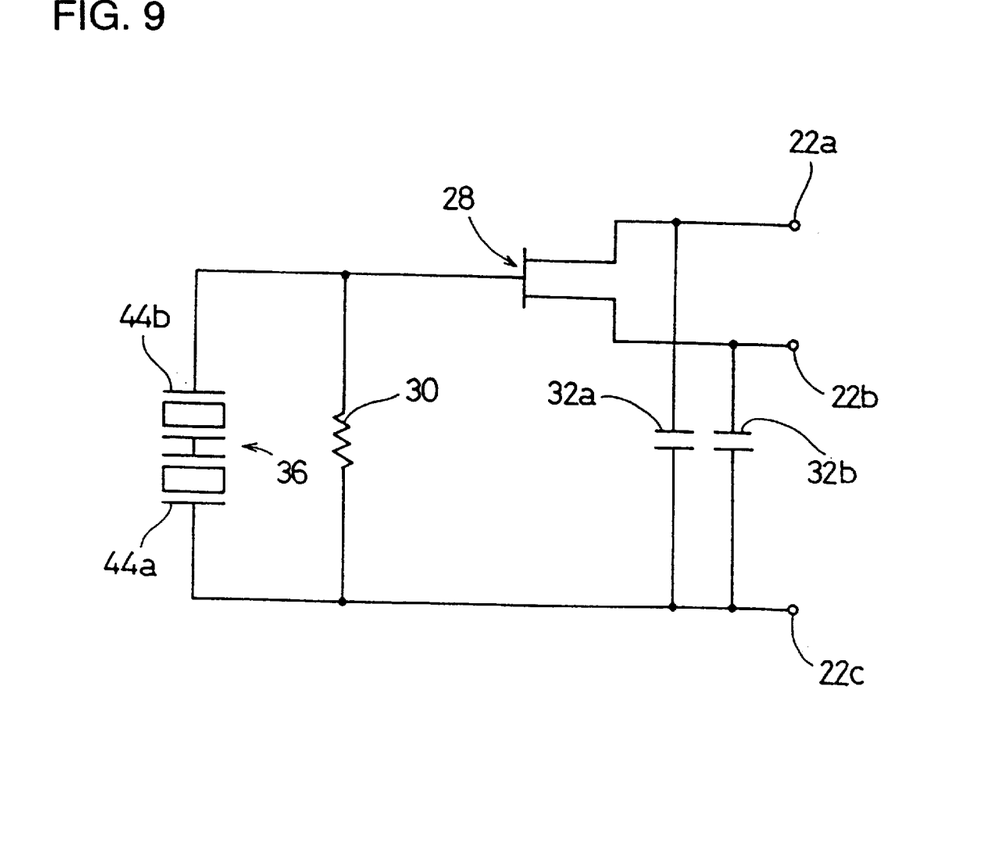
FIG. 9 is a circuit diagram of an infrared sensor shown in FIGS. 1 through 3.

Infrared sensor 10 includes the circuit shown in FIG. 9. That is, the pyroelectric element 36 is composed of two of pyroelectric bodies polarized in opposite directions when viewed from the electrodes 44a, 44b, which are connected in series to be a pyroelectric element of dual type. A leakage resistor 30 is connected between the electrodes 44a, 44b of the pyroelectric element 36, and at the same time the electrode 44a is connected to the lead terminal 22c and the electrode 44b is connected to the gate of FET 28. Further, the drain and source of FET 28 are connected to the lead terminals 22a, 22b, respectively. Bypass capacitors 32a, 32b are connected between the drain and source of EFT 28 and the lead terminal 22c, respectively.

When infrared rays enter through the optical filter 50, electric charge is generated in the pyroelectric element 36. This electric charge is changed into a voltage through the leakage resistor 30 and this voltage is input to the gate of FET 28. A power source is connected the drain of FET 28 through the lead terminal 22a, and a signal which is proportional to the voltage input to the gate is output from the source. Therefore, by measuring the output signal from the lead terminal 22b, the change of infrared rays input to the infrared sensor 10 can be detected.

In this infrared sensor 10, the lead terminals 22a, 22b, 22c are preferably fixed and the through-holes 14a, 14b, 14c of the circuit board 12 are preferably sealed by means of caulking opposite sides of the circuit board 12 (i.e., by deforming two portions of each lead terminal at the upper and lower surfaces of the lead terminal so as to seal the lead terminal against the through hole through which it extends). Because of this, the attachment of the lead terminals 22a, 22b, 22c is made easier than the case in which the lead terminals are fixed and sealed using sealing glass as in conventional infrared sensors. Further, as the lead terminals 22a, 22b, 22c are fixed to the circuit board 12 by caulking, the lead terminals 22a, 22b, 22c do not extend along the side of one surface of the circuit board 12. Because of this structure, which is different from conventional infrared sensors, the inside portions of the lead terminals are not likely to cause inductance, and the effect of the inductance generated in the lead terminals 22a, 22b, 22c on the infrared sensor 10 is small. Therefore, it is possible to reduce occurrences of failure of the infrared sensor 10.

Further, as the through-holes 14a, 14b, 14c of the circuit board 12 are preferably sealed by caulking the terminals 22a, 22b, 22c and the circuit board 12 and cap 48 are preferably sealed by conductive resin adhesive 52, the pyroelectric element and conversion circuit 16 are hermetically sealed. Moreover, because the cap 48 is preferably made up of conductive material and is connected to the electrode 18a formed along the outside circumference on the surface of one side of the circuit board 12 by conductive resin adhesive, and still more because the electrode 18a is preferably connected to the grounding electrode 20, the effect of electro-magnetic shielding is achieved. Therefore, the influence of disturbance noise is reduced.

Further, because on the surface of one side of the circuit board 12 preferably made up of insulating material, a conversion circuit is formed and there is no need to incorporate a circuit board with a conversion circuit 16 formed thereon. As a result, the inside space can be small to reduce the size of the infrared sensor 10. In this way, as there is no need of incorporating a circuit board, it is not necessary to process the circuit board 12 in a precise manner and it is easy to attach the lead terminals 22a, 22b, 22c. Accordingly, the manufacture of the infrared sensor 10 is made easy and it is possible to manufacture the infrared sensors 10 more inexpensively.

Figure 10:
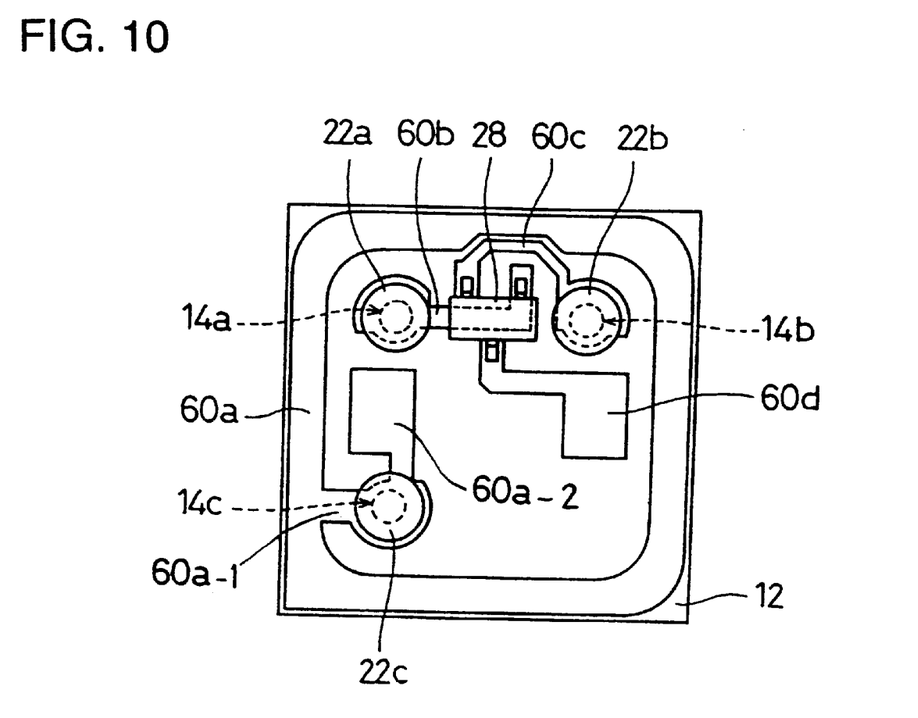
FIG. 10 is a top view showing the inside of another example of an infrared sensor of the present invention.
Figure 11:
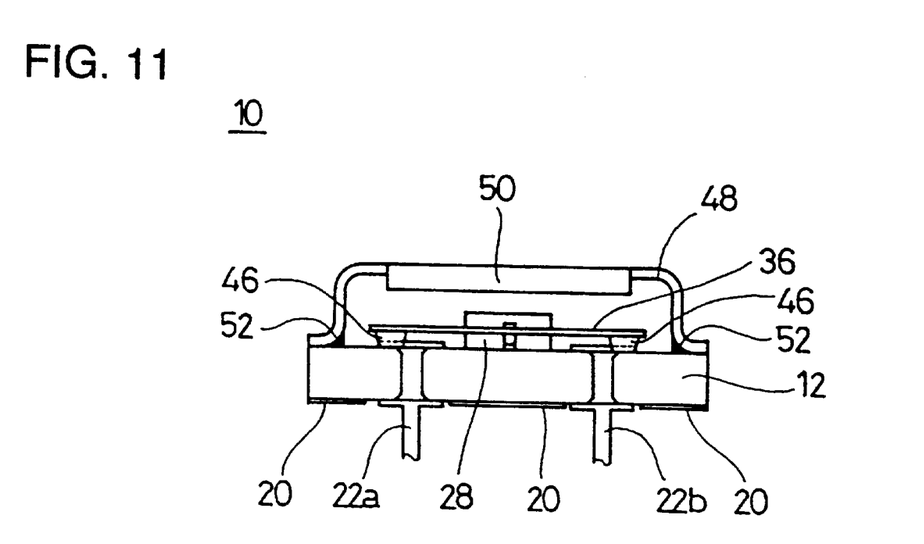
FIG. 11 is a cross section of an infrared sensor shown in FIG. 10.
Figure 12:
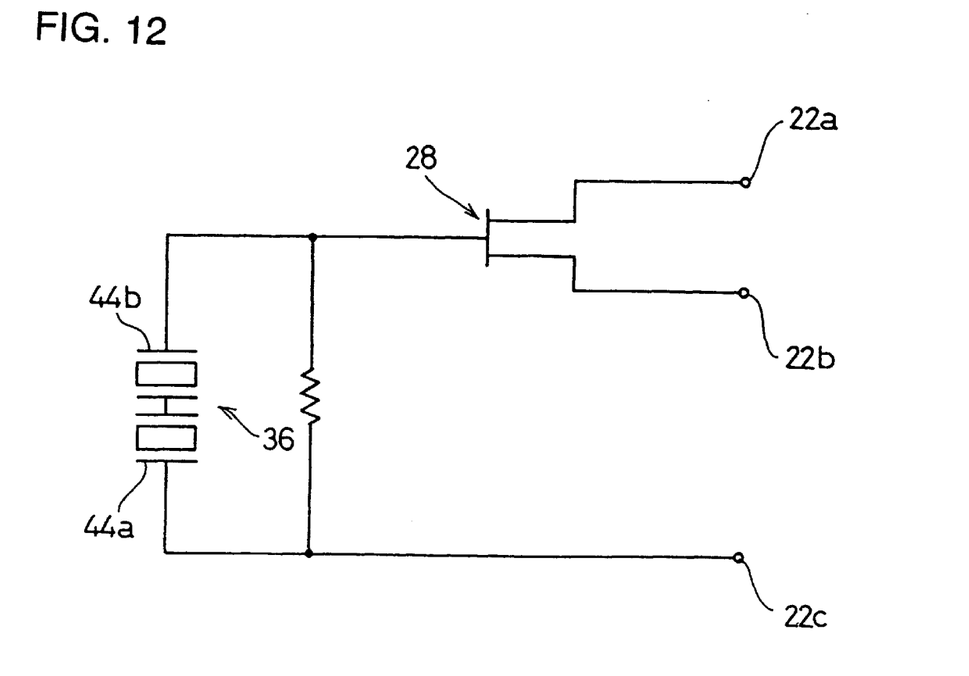
FIG. 12 is a circuit diagram of an infrared sensor shown in FIGS. 10 and 11.

A second embodiment of the invention is shown in FIGS. 10–12. This embodiment is similar in many respects to the embodiment of FIGS. 1–3. Like elements are designated with like numerals and will not be redescribed with respect to this embodiment. In this infrared sensor 10, and electrode 60a is formed along the outside circumference on one main side surface of the circuit board 12. The circuit board 12 is made up of insulating material. The electrode 60a is formed to include a portion 60a-1 which extends to the through-hole 14c and a second portion 60a-2 which extends away from the through-hole 14c. Also, in this infrared sensor 10, an electrode is formed on the inside surface of the through-hole 14c and the electrode 60a and grounding electrode 20 are electrically connected together. In the space between the through-holes 14a, 14b, the electrodes 60a, 60b, 60c are formed so as to come close to one another. The electrode 60b extends to the through-hole 14a, and the electrode 60c extends to the through-hole 14b. The electrode 60d extends to a location wherein it faces the portion 60a-2 of the electrode 60a.

In this infrared sensor 10, the lead terminals 22a, 22b, 22c are preferably attached to the through-holes 14a, 14b, 14c by caulking. In the space between the through-holes 14a, 14b, an FET 28 is arranged, and the drain is connected to the electrode 60b, the source to the electrode 60c, and the gate to the electrode 60d. Further, pyroelectric element 36 is mounted in the portion facing the electrodes 60a, 60d. The electrodes 44a, 44b of the FET 28 are connected to the electrodes 60a, 60d of the circuit board 12 by conductive resin adhesive. A cap 48 is placed over the upper main surface of the circuit board 12 so as to cover the conversion circuit 16 and pyroelectric element 36. In this infrared sensor 10, the circuit as shown in FIG. 12 is obtained. While no independent resistor is provided as shown in FIG. 2, the solid resistor of the pyroelectric element itself is used as a leakage resistance.

This infrared sensor 10 achieves the same effects as the infrared sensor 10 shown in FIG. 2. Further, as the FET 28 is arranged in the space between the through-holes 14a, 14b and is not located in the central portion of the circuit board 12, the FET 28 does not come between the pyroelectric element and the circuit board 12 even if the pyroelectric element is arranged in the central portion. Because of this, as there is no need of connecting parts to attach the pyroelectric element 36, the height of the infrared sensor 10 can be lowered.

Figure 13:
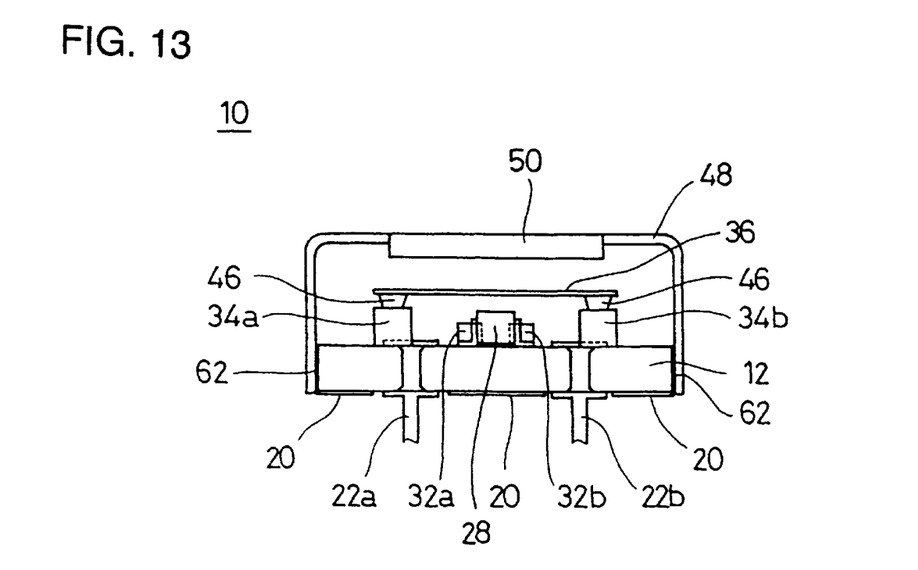
FIG. 13 is a cross sectional view of an infrared sensor showing another way of putting on a cap.

As an alternative construction, when the cap 48 is placed on the circuit board 12, it may cover the side portion of the circuit board 12 as shown in FIG. 13. In this case, the cap 48 and the grounding electrode 20 of the circuit board 12 are electrically connected by conductive resin adhesive 62. In this way, as area surrounding of the conversion circuit 16 and pyroelectric element 36 is covered by conductive material, good electro-magnetic shielding is provided. Further, the stem may be of multilayer construction. In this case, by forming one layer or a plurality of electric layers inside and connecting these electrode layers to the grounding electrode 20, a better electro-magnetic shielding effect is made available.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An infrared sensor comprising:
   a stem having two main surfaces, an electrode provided on one main surface of the stem so as to extend in a closed loop along the outer circumference of the stem, and a ground electrode provided on the other main surface of the stem for providing electro-magnetic shielding;
   a pyroelectric element arranged on said one main surface of the stem;
   a conversion circuit disposed on said one main surface of the stem for changing electric charge generated in the pyroelectric element into a signal; and
   a plurality of lead terminals extending through respective openings in the stem from said one main surface of the stem to the other main surface of the stem and being electrically connected to the conversion circuit, the lead terminals being deformed adjacent the openings to fix and seal the lead terminals to the stem;
   a case made of conductive material, said case being electrically connected to the electrode provided along the outer circumference on said one main surface of the stem;
   wherein the electrode on said one main surface of the stem is electrically connected to the ground electrode on the other main surface of the stem by one of the lead terminals through one of said openings.

2. An infrared sensor according to claim 1, wherein the stem is made of insulating material, and the conversion circuit is located on said main surface of the stem.

3. An infrared sensor according to claim 1, wherein the case and stem are sealed by conductive resin adhesive which electrically couples the case to the ground electrode and the case covering the pyroelectric element.

4. An infrared sensor according to claim 1,
   wherein the lead terminals are fixed to the stem by respective flattened portions of the lead terminals located on opposite sides of the stem.

5. An infrared sensor according to claim 4,
   wherein the respective flattened portions sandwich the stem therebetween.

6. An infrared sensor according to claim 5, wherein the flattened portions hermetically seal the lead terminals to the stem.

7. A infrared sensor comprising:
   a circuit board made of an insulating material and having first and second main surfaces and a plurality of through-holes which extend from the first main surface to the second main surface;
   a pyroelectric element arranged on the first main surface of the circuit board, the pyroelectiic element receiving an infrared ray and generating an electric charge in response to the infrared ray;
   a conversion circuit electrically connected to the pyroelectric element for converting the electric charge into a signal, the conversion circuit being formed on the first main surface of the circuit board;
   a plurality of lead terminals each having first and second protrusion portions and being electrically connected to the conversion circuit, each of the lead terminals being located in a respective one of the through-holes of the circuit board such that its first protrusion portion and its second protrusion portion are provided on the first main surface and the second main surface, respectively, and hermetically seal the respective through-hole;
   a case made of a conductive material; and
   wherein the circuit board has an electrode provided on one main surface of the circuit board so as to extend In a closed loop along the outer circumference of the circuit board, and a ground electrode provided on the other main surface of the circuit board for providing electro-magnetic shielding;
   wherein the electrode on the one main surface is electrically connected to the case and to the ground electrode.

8. A infrared sensor according to claim 7,
   further comprising a ground electrode provided on the second main surface of the circuit board.

9. A infrared sensor according to claim 8, further comprising a case which covers the pyroelectric element and the conversion circuit, the case being made of a conductive material and being bonded to a ground electrode on the circuit board by a conductive adhesive such that the case and the circuit board hermetically seal the pyroelectric element and the conversion circuit.

10. An infrared sensor comprising:
    a stem formed of a conductive material;
    a pyroelectric element arranged on one side of the stem;
    a conversion circuit disposed on the one side of the stem for changing electric charged generated in the pyroelectric element into a signal; and
    a plurality of lead terminals extending through respective openings in the stem from one side of the stem to the other side of the stem and being electrically connected to the conversion circuit, the lead terminals being fixed and sealed to the stem by deformed portions of the lead terminals on both sides of the respective openings through which the lead terminals extend; and
    a case made of a conductive material, the case and the stem being sealed by a conductive resin adhesive and the case covering the pyroelectric element.

* * * * *